United States Patent
Cap et al.

(10) Patent No.: US 9,127,861 B2
(45) Date of Patent: Sep. 8, 2015

(54) TARGETS FOR HELIOSTAT HEALTH MONITORING

(75) Inventors: Daniel P. Cap, Chatsworth, CA (US); Thomas M. Walczuk, Westlake Village, CA (US)

(73) Assignee: SolarReserve Technology, LLC, Santa Monica, CA (US)

( * ) Notice: Subject to any disclaimer, the term of this patent is extended or adjusted under 35 U.S.C. 154(b) by 593 days.

(21) Appl. No.: 13/286,185

(22) Filed: Oct. 31, 2011

(65) Prior Publication Data

US 2013/0104963 A1    May 2, 2013

(51) Int. Cl.
*G01B 11/14* (2006.01)
*F24J 2/38* (2014.01)
*G05B 23/02* (2006.01)

(52) U.S. Cl.
CPC .............. *F24J 2/38* (2013.01); *F24J 2002/385* (2013.01); *G05B 23/0283* (2013.01); *Y02E 10/41* (2013.01); *Y02E 10/47* (2013.01); *Y02E 10/52* (2013.01)

(58) Field of Classification Search
CPC .................... Y02E 10/40–10/47; Y02E 10/50; Y02E 10/52; F24J 2/10–2/18; F24J 2/40; F24J 2/407; F24J 2202/385; F24J 2202/1076
USPC .......................... 356/614, 620, 622, 399, 400
See application file for complete search history.

(56) References Cited

U.S. PATENT DOCUMENTS

| | | | |
|---|---|---|---|
| 4,146,784 A | 3/1979 | Yekutieli | |
| 4,219,729 A | 8/1980 | Smith | |
| 4,612,488 A | 9/1986 | Uhlemann et al. | |
| 6,984,050 B2 * | 1/2006 | Nakamura | 359/853 |
| 7,115,851 B2 | 10/2006 | Zhang | |
| 7,847,182 B2 | 12/2010 | Lin et al. | |
| 8,033,110 B2 * | 10/2011 | Gilon et al. | 60/641.11 |
| 8,129,668 B2 * | 3/2012 | Chang et al. | 250/203.4 |
| 8,324,547 B2 * | 12/2012 | Chang et al. | 250/203.4 |
| 8,344,305 B2 * | 1/2013 | Convery | 250/203.4 |
| 8,582,092 B1 * | 11/2013 | Yellowhair et al. | 356/138 |
| 2006/0124870 A1 * | 6/2006 | Bobanovic et al. | 250/493.1 |
| 2009/0178668 A1 | 7/2009 | Boggavarapu | |
| 2010/0139644 A1 * | 6/2010 | Schwarzbach et al. | 126/573 |
| 2010/0252024 A1 | 10/2010 | Convery | |
| 2011/0036343 A1 | 2/2011 | Kroyzer et al. | |
| 2011/0094499 A1 * | 4/2011 | Kounosu | 126/601 |
| 2011/0120448 A1 * | 5/2011 | Fitch et al. | 126/601 |
| 2011/0317876 A1 * | 12/2011 | Bender | 382/103 |

FOREIGN PATENT DOCUMENTS

| | | |
|---|---|---|
| CN | 101595405 | 12/2009 |
| WO | WO 2009/131787 | 10/2009 |

* cited by examiner

*Primary Examiner* — Michael A Lyons
*Assistant Examiner* — Shawn Decenzo
(74) *Attorney, Agent, or Firm* — Kagan Binder, PLLC

(57) ABSTRACT

Disclosed is a system and method including targets for heliostat health monitoring. A controller in communication with a target and the heliostat may be operable to determine heliostat health. The disclosed system and method may be used to automatically focus individual heliostats, as needed, and to generally increase the overall health of a heliostat field.

19 Claims, 3 Drawing Sheets

| EXPECTED IMAGE | MAPPED IMAGE | ACCEPTABLE? (Y/N) |
|---|---|---|
| 200 | 202 | Y |
| 200 | 204 | N |
| 200 | 206 / 208 | N |

FIG.5

TARGETS FOR HELIOSTAT HEALTH MONITORING

BACKGROUND

This application relates to heliostat health monitoring, as well as a system and method therefor.

Solar power plants typically include a heliostat field having a plurality of heliostats that direct solar energy toward a central receiver. The health (including aim and focus) of each heliostat, relative to the receiver, may impact the overall efficiency of the solar power plant.

BRIEF DESCRIPTION OF THE DRAWINGS

The drawings can be briefly described as follows:

FIG. 5 is a table including examples of images that may be evaluated in the disclosed method.

DETAILED DESCRIPTION

Figure 1:
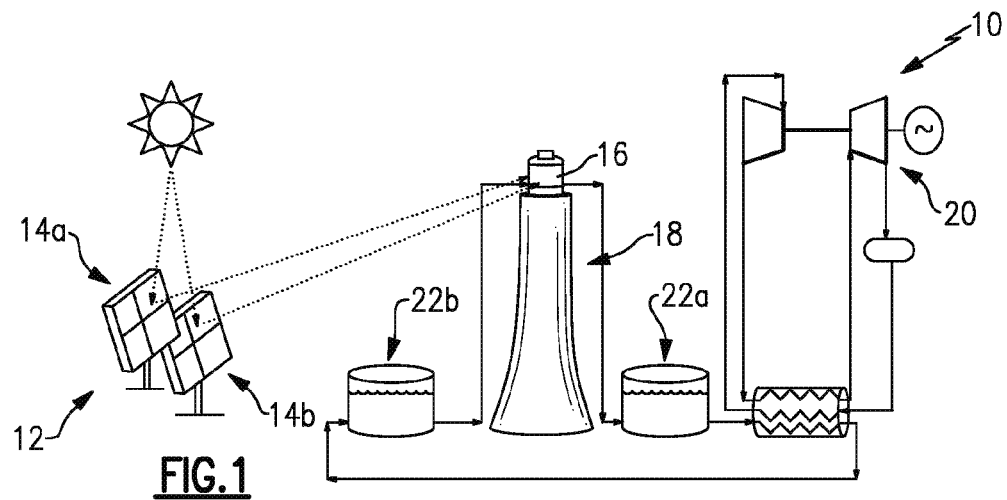
FIG. 1 shows an exemplary solar power plant.

An exemplary solar power plant 10 is represented in FIG. 1. In the disclosed non-limiting embodiments, a heliostat field 12 includes a plurality of heliostats 14a, 14b directing solar energy toward a central receiver 16 located on a tower 18. The receiver 16 may include a heat-absorbing fluid, such as a molten salt. The heated fluid is used to produce steam and drive a turbine 20 to generate electricity. The heat-absorbing fluid may be stored in or circulated through one or more tanks 22a, 22b. This example is shown for illustrative purposes only, and this disclosure may be used in other applications.

While only two heliostats 14a, 14b are shown, the heliostat field 12 may include any number of heliostats. In some examples, thousands of heliostats are used. Each heliostat 14a, 14b may be associated with an actuator governing aiming of the heliostat.

Figure 2:
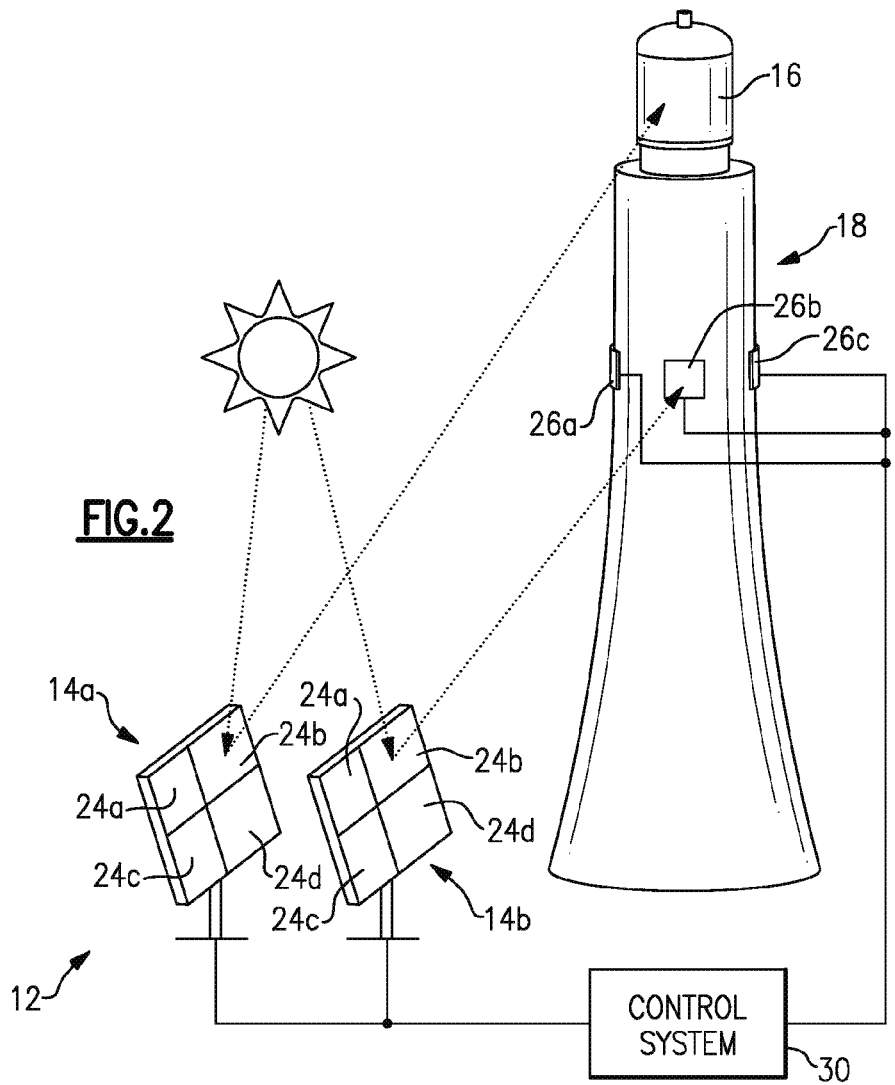
FIG. 2 is a schematic-type view of the disclosed system including a plurality of exemplary targets.

Turning to FIG. 2, each heliostat 14a, 14b includes one or more reflective panels 24a-24d. The efficiency of the solar power plant 10 may in part depend upon the aim of the heliostats 14a, 14b relative to the receiver 16, as well as the positioning of each of the panels 24a-24d relative to their respective heliostat 14a, 14b (e.g., the heliostat focus). The position of the panels 24a-24d relative to their associated heliostat 14a, 14b may vary over time (e.g., the heliostats 14a, 14b may lose focus), and thus the panels 24a-24d may require adjusting. Each of the panels 24a-24d may be associated with an actuator regulating the position of each of the panels 24a-24d relative to the respective heliostat 14a, 14b. In some cases, however, the panels 24a-24d are not associated with independent actuators, and are instead manually adjusted. While the heliostats 14a, 14b are shown including four panels 24a-24d, this number may vary. In some examples, heliostats include between thirty and sixty panels.

One or more targets 26a-26c may be positioned on the tower 18 (e.g., as shown, at a point below the receiver 16). The targets 26a-26c may be panels including a number of photocells responsive to light. In this sense, the targets 26a-26c may can be defined as an array of photocells. While three targets 26a-26c are shown, the number of targets 26a-26c may vary, as desired. Further, the targets 26a-26c may be positioned away from the tower 18 (e.g., on a separate structure).

Figure 3:
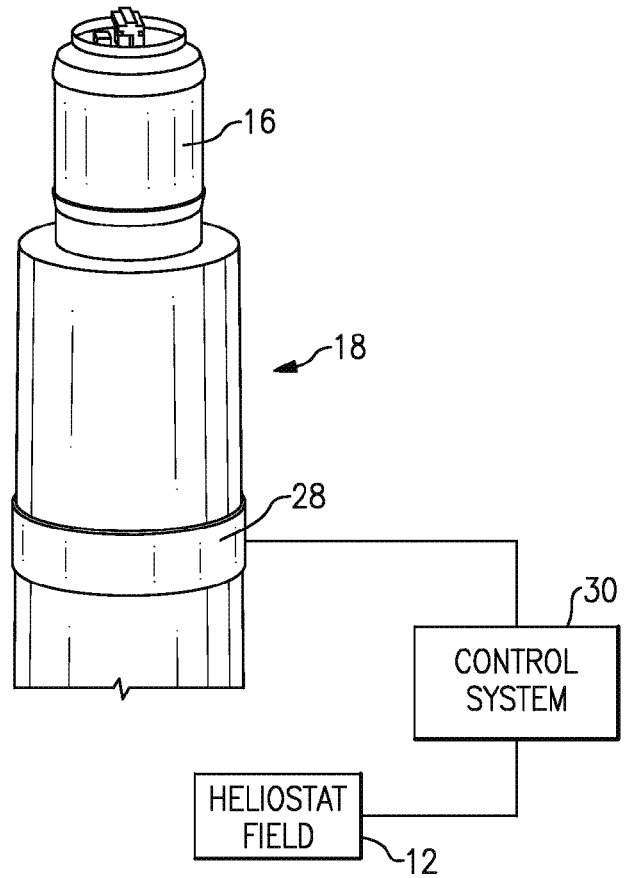
FIG. 3 is another schematic-type view of the disclosed system including an exemplary ring target.

With reference to FIG. 3, the targets 26a-26c may be replaced by a single ring target 28. The ring target 28 may extend circumferentially around the entire tower 18 or another, separate structure. The ring target 28 may have the added benefit of directly facing the various heliostats disposed circumferentially around the tower 18.

A control system, or controller, 30 is in communication with each heliostat 14a, 14b (e.g., and in particular the aiming actuators of the heliostats) within the field 12, and the targets 26a-26c. In the case that the individual panels 24a-24d include independent actuators, the control system 30 may be associated with each of those actuators as well. Further, the control system 30 is capable of mapping the distribution of light projected onto the targets (e.g., including general shape of an image seen by the target, as well as an intensity distribution of that image). Examples of mapped images are shown in FIG. 5 and discussed below.

The control system 30 includes a computer, which may include a processor (or CPU), memory, and one or more I/O ports. In general, the control system 30 is capable of receiving information, making determinations based on that information, and providing actionable instructions, among other things. In addition to image mapping, the control system 30 may be used to aim the heliostats 14a, 14b, and to further adjust each of the individual panels 24a-24d relative to their associated heliostat (e.g., the focus of each heliostat 14a, 14b) for example.

During normal operation, substantially all of the heliostats within the field 12 are aimed at the receiver 16 to heat the fluid therein. To check the health of an individual heliostat in the field 12, the heliostats 14a, 14b may be aimed, in turn, at one of the targets 26a-26c (or, in the case of a ring target 28 is used, at the ring target 28).

What follows is one disclosed non-limiting example of the disclosed method of checking heliostat health. For example, in FIG. 2 the health of the heliostat 14b is being checked. Instead of the receiver 16, the heliostat 14b is aimed at the target 26b (e.g., step 102 in FIG. 4). In this embodiment, the remaining heliostats in the field 12, represented by the single heliostat 14a, are aimed at the receiver 16.

The control system 30 is provided with information (e.g., data related to light distribution and light intensity at the target 26b) from the target 26b. The control system 30 may then evaluate that information by first mapping the distribution of light projected onto the target 26b by the heliostat 14b (e.g., step 104), and next processing the information by comparing that mapped light distribution, or mapped image, with an expected light distribution map, or expected image (e.g., step 106). The result of this comparison may indicate that at least one of the panels 24a-24d on the heliostat 14b need adjustment.

In FIG. 5, an exemplary expected image 200 is shown, as well as several representative mapped images 202, 204, 206. The expected image 200 may be a predetermined image stored in the memory of the control system 30 indicating acceptable bounds for a mapped image. Alternatively, or in addition, the expected image may indicate an acceptable light intensity distribution. In FIG. 5, light intensity distribution is represented by dots, while the acceptable image bounds is represented by the image shape.

For example, the shape of a first exemplary mapped image 202 is within the bounds of the expected image 200. Further, the exemplary mapped image 202 has an acceptable light distribution. The mapped image 202 is thus deemed acceptable, indicating that that particular heliostat is healthy. The example mapped image 204 is representative of an image exceeding the bounds of the expected image 200, and the example mapped image 206 is representative of an image with an unacceptable light distribution, particularly due to the concentration of light at area 208. In either case, the heliostats associated with images 204, 206 may need adjusting.

If the mapped image from the target 26b is inconsistent with the expected image (e.g., the shape and/or intensity distribution of the predetermined image differs from that of the mapped image from the target 26b), the control system 30 may adjust the panels 24a-24d of the heliostat 14b accordingly (e.g., step 108) or, in the case that the panels 24a-24d are manually adjustable, initiate a service order for the panels 24a-24d to be adjusted. In this sense, the control system 30 may be capable of determining, based on a comparison between the mapped image from the target 26b and the expected image, the position of the individual panels 24a-24d, as well as the manner in which the panels 24a-24d of the heliostat 14b need to be adjusted.

Further, the expected image may be provided by a previously stored image from the heliostat 14b. By comparing the mapped image from the target 26b with the previously stored image, the fluctuation in health of the heliostat 14b can be monitored, and maintenance can be requested or the heliostat 14b may simply be re-adjusted, as needed.

After adjustment, the comparison may repeat (e.g., by return to step 104) to ensure that the adjustment was appropriate, or to determine whether further adjustment is necessary. This process may continuously and automatically repeat until the mapped image from the heliostat 14b is considered acceptable. Once the image from the heliostat 14b is considered acceptable, the heliostat 14b may be aimed at the receiver 16 (e.g., step 110).

Figure 4:
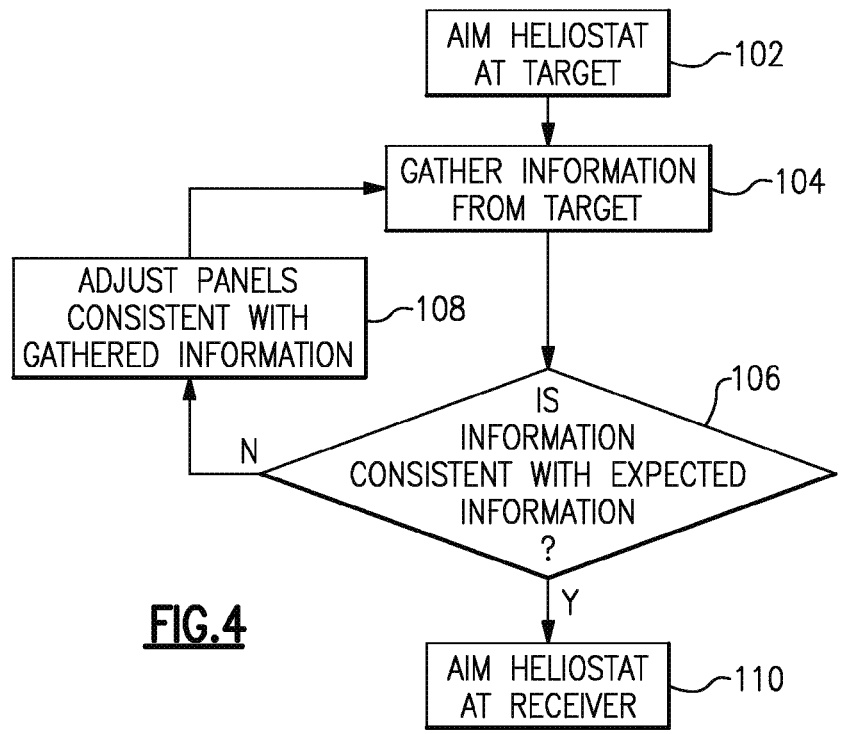
FIG. 4 is a flow chart representative of the disclosed method.

The method represented in FIG. 4 may be used to initially calibrate a heliostat (e.g., during assembly of a field, each new heliostat may be calibrated, in turn). Further, the method may be used to continually monitor the heliostats within a field during operation of the associated power plant. As noted above, some heliostat fields may include thousands of heliostats. Therefore, the method may be used to check the health of each individual heliostat, in succession. Once every heliostat is checked, a relatively large amount of time may have passed since the first heliostat was inspected. Thus, it may be necessary to immediately begin checking the heliostats again. Alternatively, this method could be employed to check heliostat field health periodically, such as once per week. Accordingly, the disclosed system and method may be used automatically focus individual heliostats, as needed, and to increase overall field health.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A heliostat system, comprising:
a heliostat;
a target, wherein the target includes an array of photocells; and
a controller in communication with the target and the heliostat, the controller operable to determine heliostat healthy by comparing a size and a distribution of a mapped image to a predetermined image, the mapped image corresponding to the light reflected onto the target by the heliostat, comparing the distribution and a shape of light at the array to a predetermined image, and ordering a heliostat adjustment when the shape exceeds the bounds of the predetermined image.

2. The system as recited in claim 1, wherein the heliostat includes at least one panel, and the controller receives information from the target indicative of a position of the at least one panel.

3. The system as recited in claim 2, wherein the controller initiates an order to adjust the at least one panel based an evaluation of the information from the target.

4. The system as recited in claim 2, wherein the at least one panel includes a plurality of panels.

5. The system as recited in claim 1, wherein the heliostat is one of a plurality of heliostats in a heliostat field, and wherein the controller continually monitors the plurality of heliostats.

6. The system as recited in claim 1, further including a tower, the target positioned on the tower.

7. The system as recited in claim 6, wherein the target is one of a plurality of targets positioned on the tower.

8. The system as recited in claim 6, wherein the target is a ring extending around the tower.

9. The system as recited in claim 1, wherein the controller initiates an order to adjust the heliostat when a shape of the mapped image exceeds the bounds of the predetermined image.

10. The system as recited in claim 1, wherein the controller converts solar energy from the sun, as received by the photocells, into the mapped image.

11. A method comprising the following steps:
aiming a heliostat at a target, the heliostat having at least one panel, the target having an array of photocells;
gathering information from the target indicative of a position of the at least one panel, the information including an image representing a size and a distribution of light projected onto the target from the heliostat;
comparing the gathered information with expected information;
determining, in response to the comparing step, whether an adjustment of the at least one panel is necessary;
comparing the distribution and a shape of light at the array to a predetermined image; and
ordering a heliostat adjustment when the shape exceeds the bounds of the predetermined image.

12. The method as recited in claim 11, further including the step of:
aiming another heliostat at the target in response to a determination that no adjustment is needed in the determining step.

13. The method as recited in claim 11, wherein the expected information is a predetermined image representing an acceptable heliostat image.

14. The method as recited in claim 11, wherein the expected information was previously gathered from the heliostat.

15. The method as recited in claim 11, wherein the heliostat is aimed at a target such that light from the sun is directly reflected onto the target by the heliostat.

16. A method comprising the following steps:
aiming a heliostat at an array of photocells, the heliostat having at least one panel, thereby creating a distribution of light intensity at the array and a size of light at the array;
gathering information from the array, wherein the information is related to the distribution and size;
processing the information to determine a position of the at least one panel;
comparing the distribution and a shape of light at the array to a predetermined image; and ordering a heliostat adjustment when the shape exceeds the bounds of the predetermined image.

17. The method as recited in claim 16, further including the step of initiating an order to adjust the at least one panel based an evaluation of the processed information.

18. The method as recited in claim 16, wherein the at least one panel includes a plurality of panels.

19. The method as recited in claim 16, wherein the heliostat is one of a plurality of heliostats in a heliostat field.

\* \* \* \* \*